US009342577B2

(12) United States Patent
Nemery De Bellevaux et al.

(10) Patent No.: US 9,342,577 B2
(45) Date of Patent: May 17, 2016

(54) PREFERENCE-BASED DATA REPRESENTATION FRAMEWORK

(71) Applicants: Philippe Jehan Julien Cyrille Pontian Nemery De Bellevaux, Shanghai (CN); Xingtian Shi, Shanghai (CN); Fu Zhao, Shanghai (CN)

(72) Inventors: Philippe Jehan Julien Cyrille Pontian Nemery De Bellevaux, Shanghai (CN); Xingtian Shi, Shanghai (CN); Fu Zhao, Shanghai (CN)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 14/073,839

(22) Filed: Nov. 6, 2013

(65) Prior Publication Data

US 2015/0120732 A1 Apr. 30, 2015

(30) Foreign Application Priority Data

Oct. 31, 2013 (CN) .......................... 2013 1 0530491

(51) Int. Cl.
*G06F 17/30* (2006.01)
(52) U.S. Cl.
CPC .... *G06F 17/30598* (2013.01); *G06F 17/30867* (2013.01); *G06F 17/30994* (2013.01)
(58) Field of Classification Search
CPC ............... G06F 17/30598; G06F 17/30867; G06F 17/30994
See application file for complete search history.

(56) References Cited

U.S. PATENT DOCUMENTS

| 5,774,121 A * | 6/1998 | Stiegler ............... G06Q 10/10 706/46 |
| 2002/0042793 A1* | 4/2002 | Choi ................ G06F 17/30687 |
| 2004/0210491 A1* | 10/2004 | Sadri ..................... G06Q 30/02 705/12 |
| 2006/0212817 A1* | 9/2006 | Paek ................. G06F 17/30864 715/745 |
| 2006/0218563 A1* | 9/2006 | Grinstein ................. G06F 8/20 719/328 |
| 2006/0242564 A1* | 10/2006 | Egger ............... G06F 17/30321 715/210 |
| 2013/0060812 A1* | 3/2013 | Rothschild ........ G06F 17/30864 707/771 |

OTHER PUBLICATIONS

J. P. Brans et al., Note, A Preference Ranking Organisation Method: The PROMETHEE Method for Multiple Criteria Decision-Making, Management Science, Jun. 6, 1985, 10 pages, vol. 31, Institute for Operations Research and the Management Sciences (INFORMS), the United States of America.

* cited by examiner

*Primary Examiner* — Kris Mackes
(74) *Attorney, Agent, or Firm* — Horizon IP Pte. Ltd.

(57) ABSTRACT

Described herein is a technology for facilitating preference-based data representation. In accordance with one aspect of the technology, preference information is acquired from a user. Rank scores of objects are generated based at least in part on the user preference information. The objects are grouped into one or more clusters of objects based on the rank scores. A visualization of the one or more clusters of objects is then generated.

20 Claims, 15 Drawing Sheets

| Rank of intensity of importance | Definition |
|---|---|
| 1 | Equal importance |
| 2 | Weak |
| 3 | Moderate importance |
| 4 | Moderate plus |
| 5 | Strong importance |
| 6 | Strong plus |
| 7 | Very strong or demonstrated importance |
| 8 | Very, very strong |
| 9 | Extreme importance |

Fig. 3c

```
criterion_i ← (Category_i, Rank_i)
Matrix A ← 0
Total_Sum ← 0

For i=1 to q with step 1:
    Sum_Row_i ← 0
    For j=1 to q with step 1:
        Aij ← 0
        If (i = j) then Aij=1 --the intensity of criterion_i to itself is 1.
        Else
            If(Category_i != Category_j) --criteria of different categories
                If(Category_i=1, Category_j=2): Aij ← 4
                If(Category_i=1, Category_j=3): Aij ← 8
                If(Category_i=2, Category_j=3): Aij ← 4

Else --The criteria belong to the same category
                DR_i_j ← rank_i - rank_j
                If(1 <= DR_i_j <8):
                    Aij ← (DR_i_j + 1)
                ElseIf (Difference_rank_ij >=8):
                    Aij ← 8
                ElseIf (Difference_rank_ij <-8):
                    Aij ← 1/8
                Else
                    Aij ← 1/(DR_i_j+1)
        Sum_Row_i ← Aij + Sum_Row_i
    Total_Sum ← Total_Sum + Sum_Row_i
For i=1 to q with step 1:
    Weight_crit_i = Sum_Row_i / Total_Sum
```

Fig. 3d

| Column Name | Data Type | Description |
|---|---|---|
| ID | Integer | Object ID |
| Name | String | Name of the object |
| Brand | String | Brand of the object |
| Size | Integer/String | Size of the object |
| Price | Double | Price of the object |
| Review | Double | Rating by other customers |
| Display Technology | String | Display technology... |
| ... | ... | ... |

PREFERENCE-BASED DATA REPRESENTATION FRAMEWORK

TECHNICAL FIELD

The present disclosure relates generally to preference-based data representation.

BACKGROUND

Representation of information on an e-commerce website is vital in order to attract, retain and assist consumers in making purchases. Even though detailed information about products and service offerings is widely available, such information is often not organized in a manner that is personalized or easy for users to discover the best match based on their preferences.

For example, semantic objects representing products and services are often presented in a table format on e-commerce websites. A user can change the order of display of the objects by choosing only one criterion (e.g., price, popularity, size, rating, etc.) at a time. It is difficult for the user to have a global view of the objects, particularly when there are many objects. The user may encounter a display of hundreds of different objects while shopping for a particular product (e.g., computer), making it cumbersome to find one that best matches his or her preferences.

Some websites present more in-depth tables that allow the user to compare each attribute of different objects. However, the user may not find all the displayed attributes to be relevant to the search. Such in-depth tables do not take into account the user's preferences or present a good global overview that allows the user to easily find a best match. Therefore, traditional data representation techniques may have a negative impact on user shopping experience.

SUMMARY

A technology for facilitating preference-based data representation is described herein. In accordance with one aspect of the technology, preference information is acquired from a user. Rank scores of objects are generated based at least in part on the user preference information. The objects may be grouped into one or more clusters of objects based on the rank scores. A visualization of the one or more clusters of objects may then be generated.

In accordance with another aspect of the technology, preference information is acquired from a user. Rank scores of objects may be generated based at least in part on the preference information. The objects may be grouped into one or more clusters of objects based on the rank scores. Visualization features of the one or more clusters of objects may be determined based on the rank scores. A three-dimensional visualization of the one or more clusters of objects may further be generated based on the visualization features.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Some embodiments are illustrated in the accompanying figures, in which like reference numerals designate like parts, and wherein:

FIG. 3c shows an exemplary table defining different sub-rank values of intensity of importance within a category;

FIG. 3d shows an exemplary pseudo code for converting categorical values to numerical weight values;

FIG. 4 shows an exemplary table of attributes for objects representing tablets;

DETAILED DESCRIPTION

Figure 1:
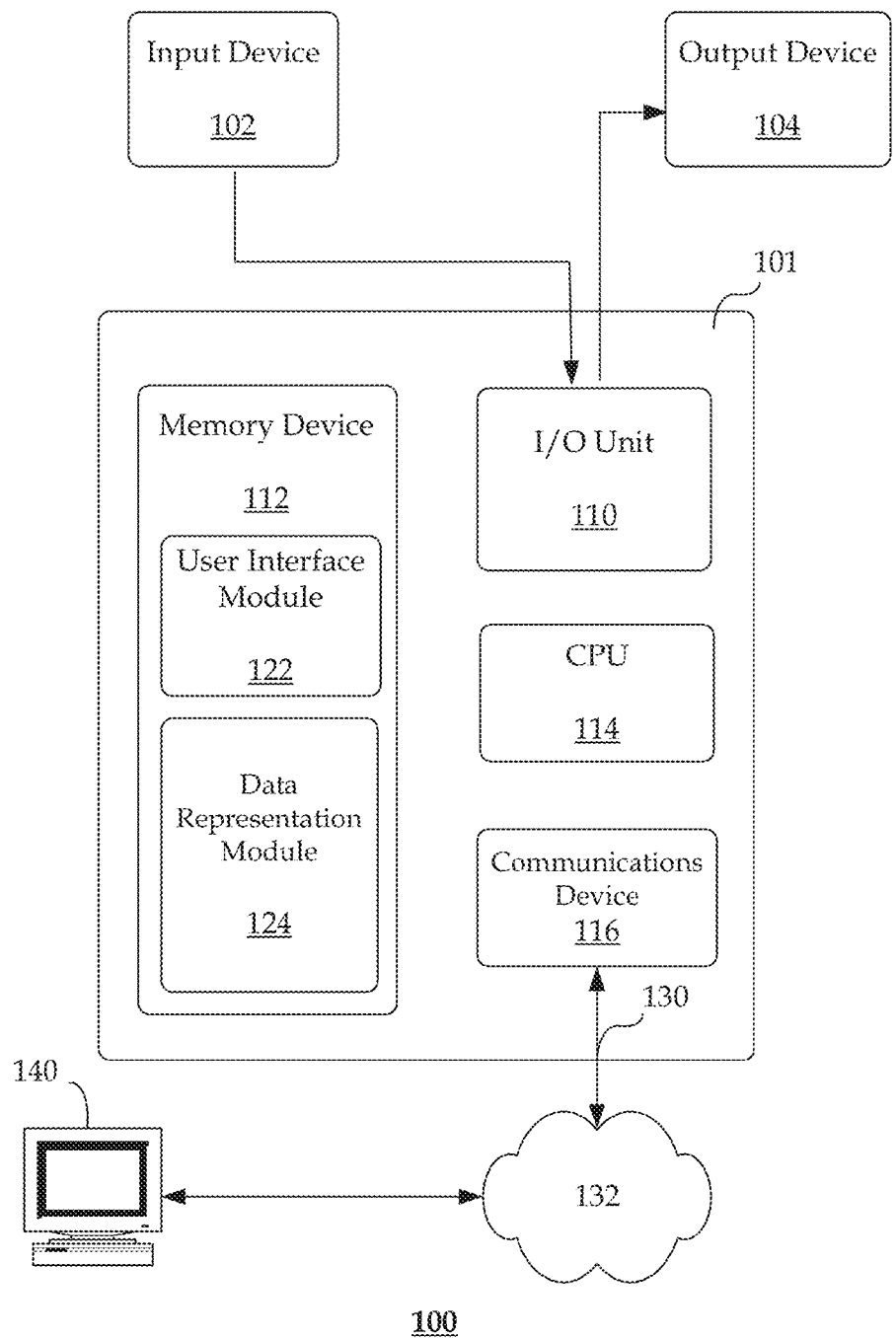
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

A framework for facilitating preference-based data representation is described herein. One aspect of the present framework advantageously presents semantic objects in accordance with the preference information provided by a user. A "semantic object" as used herein generally refers to a collection of one or more attributes that describes a distinct identity. For example, each semantic object (or "object") may describe a commercially available product (e.g., computer, tablet, phone, etc.) with attributes such as brand, price, color, size, weight, and so forth. Preference information may include, for example, personal ranking, selected criteria, perceived similarity, preference and indifference thresholds, weights, and so forth.

In one implementation, the preference information is processed to generate a three-dimensional (3D) visualization. Visualization features (e.g., location, size, color, transparency, etc.) of objects in the 3D visualization may be determined based on the objects' relevance rank scores. For instance, the most preferred objects (i.e. with high relevance rank scores) may be represented using visualization features that attract the user's attention (e.g., perceptually stronger colors, highlighting, larger size, etc.), while less relevant objects may be represented using visualization features that are less attention grabbing (e.g., semi-transparent, perceptually weaker colors, smaller size, etc.). The 3D visualization provides a global view that clearly explains the strengths and weaknesses of the different objects. Objects with similar attributes may be located in clusters, and such attributes characterizing the clusters may easily be retrieved.

The data representation framework described herein advantageously allows the user to visually identify the weaknesses and strengths (i.e. indicative attributes) of the objects based on the user's preferences. The framework allows the user to search and discover the best match easily and quickly. User experience is enhanced and personalized based on the user's interactions with the framework. These and other features and advantages will be described in more detail herein.

The framework described herein may be implemented as a method, a computer-controlled apparatus, a computer process, a computing system, or as an article of manufacture such as a computer-readable medium. These and various other features will be apparent from the following description.

FIG. 1 is a block diagram illustrating an exemplary system 100 that implements the framework described herein. The system 100 includes one or more computer systems 101, with FIG. 1 illustrating one computer system 101 for purposes of illustration only.

Turning to the computer system 101 in more detail, it may include a central processing unit (CPU) 114, an input/output (I/O) unit 110, and a memory device 112. Memory device 112 stores machine-executable instructions, data, and various programs, such as a user interface module 122 and a data representation module 124, all of which may be processed by CPU 114. As such, the computer system 101 is a general-purpose computer system that becomes a specific-purpose computer system when executing the machine-executable instructions. Alternatively, the technology described herein may be implemented as part of a software product, which is executed via an operating system (not shown). It should be noted that the various components (122, 124) may be hosted in whole or in part by different computer systems in some implementations. Thus, the techniques described herein may occur locally on the computer system 101, or may occur in other computer systems and be reported to computer system 101. Although the environment is illustrated with one computer system, it is understood that more than one computer system or server, such as a server pool, as well as computers other than servers, may be employed.

In addition, each program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and codings thereof may be used to implement the teachings of the disclosure contained herein.

The user interface module 122 includes machine-executable instructions to generate components of a user interface and to receive input from the user. It is understood that the user interface may include non-graphical, graphical or textual components, such as windows, icons, buttons, menus or the like. The user interface module 122 may include instructions to receive input from, for example, an input device 102 and present the user interface components on, for example, an output device 104.

The data representation module 124 includes tangibly encoded machine-executable instructions to perform data representation-related functions on computer system 101, client system 140, or across network 132. Data representation-related functions refer to functions that are operable to generate visualizations based on user preferences. Such data representation-related functions include, but are not limited to, ranking, clustering, projecting objects onto planes, optimizing visualization features and so forth. It should be understood that the components (122, 124) stored in memory device 112 are merely exemplary and additional modules or sub-modules may also be provided. In addition, the functions of the components (122, 124) may be combined. A function of a module need not be performed on a single machine. Instead, the function may be distributed across system 100 or a wider network, if desired.

Memory device 112 may be any form of non-transitory computer readable media, including by way of example semiconductor memory devices, such as Erasable Programmable Read-Only Memory (EPROM), Electrically Erasable Programmable Read-Only Memory (EEPROM), flash memory devices, magnetic disks such as internal hard disks and removable disks, magneto-optical disks, and Compact Disc Read-Only Memory (CD-ROM).

In one implementation, computer system 101 is coupled to an input device 102 (e.g., keyboard or mouse) and an output device 104 (e.g., monitor or screen). Computer system 101 may also include a communications card or device 116 (e.g., a modem and/or a network adapter) for exchanging data with a network 132 using a communications link 130 (e.g., a telephone line, a wireless network link, a wired network link, or a cable network). Other support circuits, such as a cache, a power supply, clock circuits and a communications bus, may also be included in computer system 101. In addition, any of the foregoing may be supplemented by, or incorporated in, application-specific integrated circuits.

Computer system 101 may operate in a networked environment using logical connections to one or more remote client systems 140 over one or more intermediate networks 132. These networks 132 generally represent any protocols, adapters, components, and other general infrastructures associated with wired and/or wireless communications networks. Such networks 132 may be global, regional, local, and/or personal in scope and nature, as appropriate in different implementations.

Remote client system 140 may be a personal computer, a mobile device, a personal digital assistant (PDA), a server, a server pool, a router, a network PC, a peer device or other common network node, and typically includes many or all of the elements described above relative to computer system 101. Client system 140 may also include one or more instances of computer readable storage media or memory devices (not shown). The computer readable storage media may include a client application suitable for interacting with the components (122, 124) over the network 132. The client application may be an internet browser, a thin client or any other suitable applications.

Figure 2:
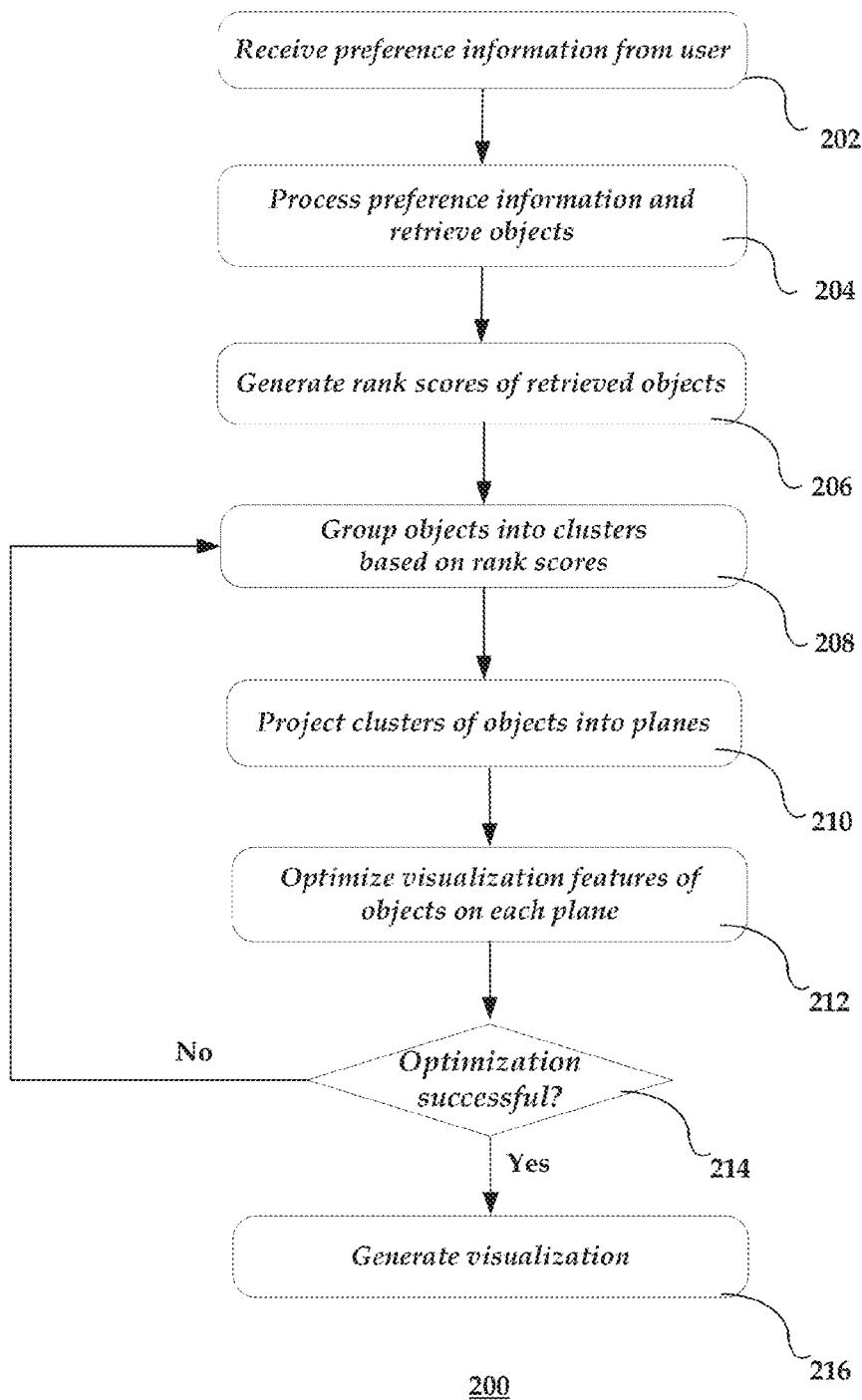
FIG. 2 shows an exemplary method in accordance with one implementation.

FIG. 2 shows an exemplary method 200 in accordance with one implementation of the present framework. The method 200 may be implemented by, for example, the computer system 101 as described in relation to FIG. 1. It should be noted that in the following discussion, reference will be made, using like numerals, to the features described in FIG. 1.

At 202, the user interface module 122 receives preference information from the user. The preference information may be received via, for example, a user interface presented at client device 140. Such preference information may include, but is not limited to, criteria information, filter information, comparison thresholds, and so forth. Comparison thresholds may include, for example, indifference, preference and/or veto thresholds. An indifference threshold represents a value below which a user may find the difference between two objects as insignificant, while a preference threshold represents a value below which the user may find the difference between the two objects as significant. A veto threshold represents a value above which the user may find the difference between the two objects as significant and excludes the worst object.

Figure 3A:
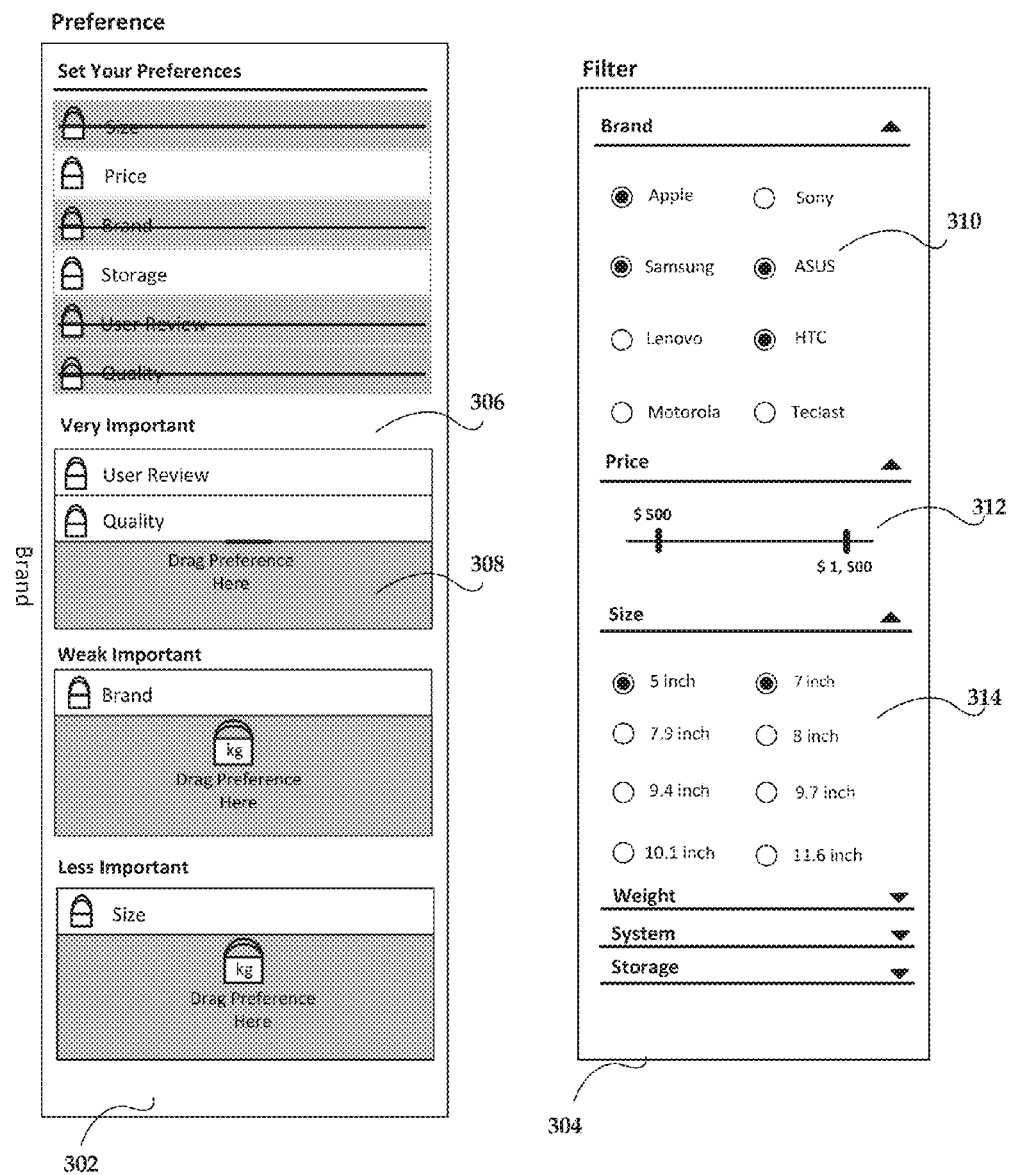
FIG. 3a shows exemplary user interfaces for acquiring preference information.

FIG. 3a shows exemplary graphical user interfaces 302 and 304 for acquiring preference information. More particularly, user interface 302 may be used to acquire criteria information. Criteria information may indicate the search criteria (e.g., desired attributes of a product or service) activated by the user, as well as the perceived relative weight or importance of each activated criterion. As shown in FIG. 3a, the relative weight or importance of each criterion as perceived by the user may be indicated by a categorical value 306 (e.g., Very Important, Weak Important and Less Important). The user may associate the categorical value 306 to a criterion by selecting and dragging the icon representing the criterion into the box 308. For example, "User Review" and "Quality" may be ranked as very important criteria, while "Size" may be ranked as the least important criterion. The user may also assign sub-categorical values to order the criteria within each category in accordance with their relative importance. For instance, "User Review" may be ranked first and "Quality" second in the "Very Important" category. It should be appreciated that other methods of indicating the relative weight or importance of the criteria are also useful. For instance, the user may select a numerical weight value that represents the relative importance of each selected criterion, or assign pairwise comparison values for each pair of criteria.

Graphical user interface 304 may be used to activate filters and select their values. For example, the user may activate the brand filter and select one or more brands 310 (e.g., Apple, Samsung, etc.). Similarly, the user may also activate the price and size filters, and select a range of prices 312 and sizes 314. As shown, some filters (e.g., weight, system and storage filters) may remain deactivated.

Figure 3B:
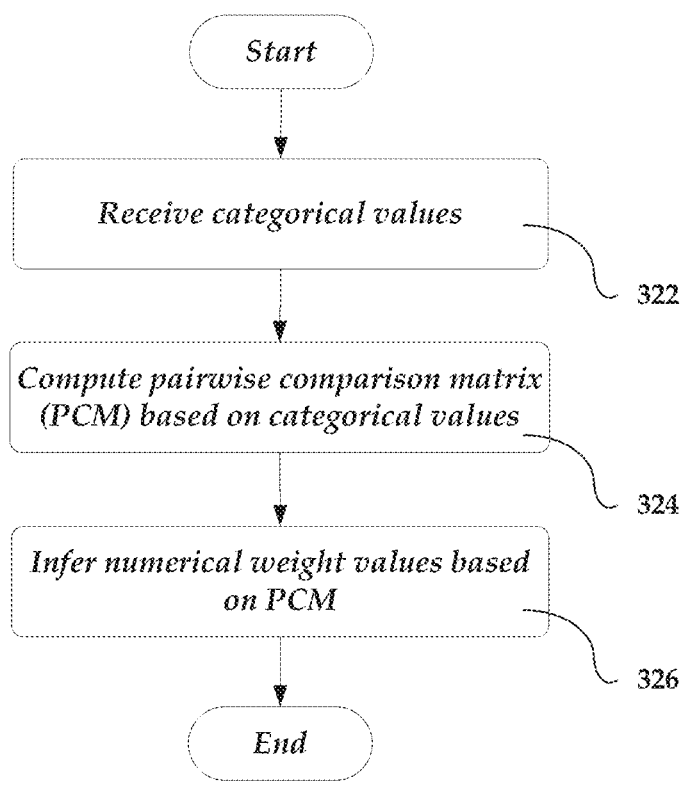
FIG. 3b shows an exemplary method of transforming categorical values to numerical weight values representing the perceived relative importance of a criteria.

FIG. 3b shows an exemplary method 320 of transforming categorical values 306 to numerical weight values representing the perceived relative importance of the criteria. It should be noted that this transformation method 320 is optionally implemented, depending on the form of indication received from the user. For instance, if the user has already selected a numerical weight value to represent the importance of the criterion, such transformation may not be necessary.

At 322, the user interface module 122 receives the categorical values 306. The categorical values may be received via, for example, user interface 302, as discussed previously. In the example illustrated in FIG. 3a, the categorical values may include a rank value representing one of three different categories: (1) Very Important; (2) Weak Important; and (3) Less Important. It should be appreciated that less or more categories may also be used. The categorical values may also include a sub-rank categorical value within a category. For example, each category may include nine different sub-rank categorical values. FIG. 3c shows an exemplary table 328 that defines potential intensities when performing pairwise comparison of the importance of two criteria. However, it should be appreciated that the potential intensities may be set by, for example, the user to values other than the nine values as shown.

Referring back to FIG. 3b, at 324, the user interface module 122 computes a pairwise comparison matrix (PCM) based on the categorical values. Each element in the PCM may correspond to a pairwise intensity of importance of criterion i over criterion j, denoted by $$a_{ij} = \frac{1}{a_{ji}}.$$

The pairwise intensity of importance $\alpha_{ij}$ may be derived by the following method A:
 (i) All criteria of Category 1 (Very Important) compared to Category 2 (Important) will have an intensity $\alpha_{ij}$ of 4.
 (ii) All criteria of Category 2 compared to Category 3 (Less Important) will have an intensity $\alpha_{ij}$ of 4.
 (iii) All criteria of Category 1 compared to Category 3 will have an intensity $\alpha_{ij}$ of 8.
 (iv) All the pair of criteria i, j of a same category (but with a different sub-rank value) will be compared as follows:

Difference_rank_$ij$=sub_rank_$i$–sub_rank_$j$

If(1<=Difference_rank_ij<8):

$$a_{ji} = (\text{Difference\_rank\_ij} + 1) \text{ and } a_{ij} = \frac{1}{a_{ji}}$$

Else If (Difference_rank_ij>=8):

$$a_{ji} = 8 \text{ and } a_{ij} = \frac{1}{8}$$

Else If (Difference_rank_ij<−8)

$$a_{ij} = 8 \text{ and } a_{ji} = \frac{1}{8}$$

Else $$a_{ij} = (\text{Difference\_rank\_ij} + 1) \text{ and } a_{ji} = \frac{1}{a_{ij}}$$

At 326, the user interface module 122 infers numerical weight values based on the PCM. The numerical weight values may be inferred by first determining the sum of elements of row i of the PCM, as follows:

$$r_i = \sum_j a_{ij} \qquad (1)$$

In a second step, the sums of the rows may be normalized to obtain the numerical weight values wt, as follows:

$$w_i = \frac{r_i}{\Sigma_i r_i} \quad (2)$$

Other methods of inferring numerical weight values are also useful. For example, in the second step, the numerical weight values may be mapped to the eigenvalues of the PCM.

FIG. 3d shows an exemplary pseudo code 330 for implementing the above-mentioned exemplary method of converting the categorical values to numerical weight values. It should be noted that such method assumes that there are q criteria that are weighted by the user.

Referring back to FIG. 2, at 204, the user interface module 122 passes the preference information to the data representation module 124 to process and retrieve objects that match the user's search criteria. The objects may be retrieved from, for example, a database implemented in memory device 112 or an external data source communicatively coupled to the computer system 101. Attributes of each object may be provided by, for example, the supplier of the product or service represented by the object.

FIG. 4 shows an exemplary table 400 of attributes for objects representing tablets. As shown, each attribute is associated with a column name, data type and description. Exemplary attributes of each tablet object include, but are not limited to, an identifier (ID), name, brand, size, price, review, display technology and so forth.

At 206, the data representation module 124 generates rank scores for the retrieved objects. The rank scores may be generated based at least in part on the attribute values of the retrieved objects, as well as the user preference information. In addition to rank scores, criterion scores may also be generated for each object.

Figure 5:
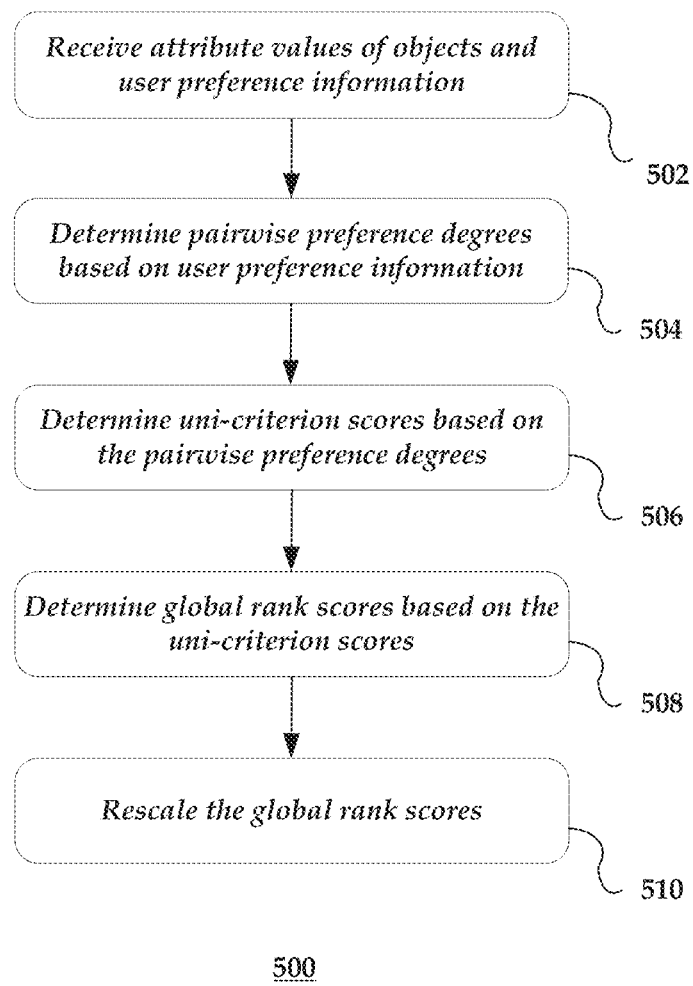
FIG. 5 shows an exemplary method of generating rank scores for retrieved objects.

FIG. 5 shows an exemplary method 500 of generating rank scores for the retrieved objects. Generally, the exemplary method 500 takes into account thresholds, and makes pairwise comparison between objects. Based on numerical weight values provided in, for example, the preference information, a score may be determined for each non-filtered object while considering the activated criteria. It should be appreciated that other different ranking methods may also be used to generate a final score for each object.

In the following description, the set of objects to be scored is denoted by: $O=\{o_1, o_2, \ldots, o_n\}$, while the set of criteria provided in the preference information is denoted by $F=\{f_1, f_2, \ldots, f_m\}$. Without any loss of generality, it is assumed that all criteria are to be maximized (e.g. customer review value). However, in other implementations, minimization of criteria is also possible. The evaluation of object $o_j$ on criterion $f_i$ is denoted by the mapping $f_i(o_j)$, where $f_i(o_j)$ is assumed to be a numeric value. The mapping may be defined by the system administrator or user.

At 502, the data representation module 124 receives attribute values of objects and user preference information. The user preference information may include, for example, thresholds, numerical weight values, activated criteria, filter information, and so forth.

At 504, the data representation module 124 determines pairwise preference degrees based on the user preference information. In some implementations, a pairwise preference degree $P_{ij}^k$ is determined for each ordered pair of objects i,j on criterion k. Such pairwise preference degree $P_{ij}^k$ reflects how better an object $o_i$ is compared to an object $o_j$. $P_{ij}^k$ may be in the range of 0 to 1, and may be computed as follows:

$$P_{ij}^k = \begin{cases} 0 & \text{if } f_k(o_i) - f_k(o_j) \le q \\ [f_k(o_i) - f_k(o_j) - q]/[p - q] & \text{if } q < f_k(o_i) - f_k(o_j) < p \\ 1 & \text{if } f_k(o_i) - f_k(o_j) \ge p \end{cases} \quad (3)$$

wherein q and p denote the indifference and preference thresholds respectively, and are computed based on the preference information, such as follows:

$$q=0.15*(\text{max\_evaluation\_on\_crit\_}k-\text{min\_evaluation\_on\_crit\_}k) \quad (4)$$

$$p=0.85*(\text{max\_evaluation\_on\_crit\_}k-\text{min\_evaluation\_on\_crit\_}k) \quad (5)$$

where max_evaluation_on_crit_k and min_evaluation_on_crit_k are respectively the maximum and minimum evaluation scores of all objects for each criterion and may be determined based on the attribute values stored in the database.

At 506, the data representation module 124 determines uni-criterion scores based on the pairwise preference degrees. More particularly, uni-criterion scores may be determined by aggregating the pairwise preference degrees with respect to the objects. A uni-criterion score $\phi^k(o_i)$ for each object $o_i$ may be determined as follows:

$$\phi^k(o_i) = \frac{\sum_{j=1}^{n} P_{ij}^k - P_{ji}^k}{n - 1} \quad (6)$$

At 508, the data representation module 124 determines global rank scores based on the uni-criterion scores. The weighted global score for each object $o_i$ may range from, for example, −1 to 1. Such global rank scores may be determined by computing a weighted aggregation with respect to the criteria as follows:

$$\Phi(o_i)=\Sigma_{k=1}^{q} w_k * \phi^k(o_i) \quad (7)$$

wherein $w_k$ represents the weight associated with criterion k.

Figure 6:
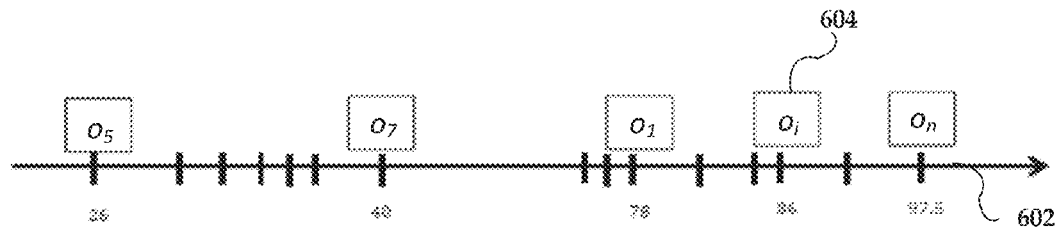
FIG. 6 illustrates exemplary global rank scores associated with different objects.

At 510, the data representation module 124 may rescale the global rank scores to a predetermined range (e.g., 0 to 100). FIG. 6 illustrates exemplary global rank scores 602 associated with different objects 604. Such resealing avoids negative scores that may not be understandable by the user. The resealing may be computed as follows:

$$\Phi^*(o_i) = \left(\frac{\Phi(o_i) + 1}{2}\right) * 100 \quad (8)$$

Referring back to FIG. 2, at 208, the data representation module 124 groups objects into clusters based on their respective rank scores. Each cluster represents a collection of one or more similarly scored objects. The clusters may be generated based on a list of retrieved objects and the global rank scores of the objects. Different clustering techniques may be used. Preferably, the clustering technique does not require the number of clusters K to be defined as input.

In some implementations, a K-means clustering method is used. Such method aims to partition n objects into k clusters in which each object belongs to the cluster with the nearest mean rank score. More particularly, the K-means clustering method may be performed for several values of k (e.g., k=2, 3, . . . , 20). For each K-clustering partition, a fitness measure (e.g., silhouette measure) may be computed. Each object is assigned to the partition with the best measure. Other exemplary clustering techniques include, but are not limited to, density-based spatial clustering of applications with noise (DBSCAN), balanced iterative reducing and clustering using hierarchies (BIRCH), clustering large applications based on randomized search (CLARANS), and so forth.

Figure 7:
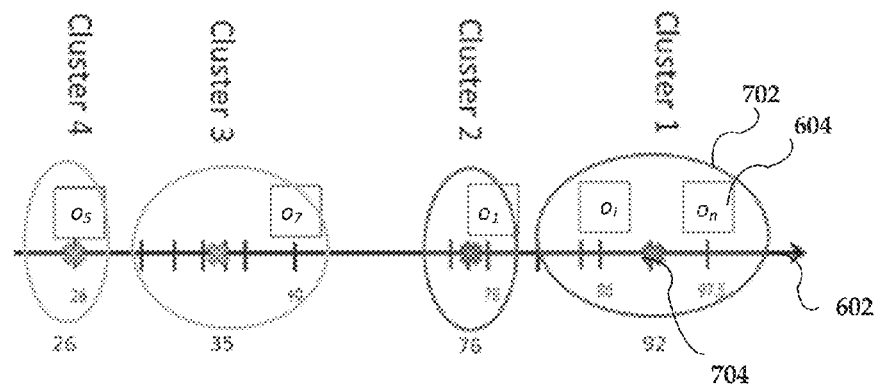
FIG. 7 shows four exemplary clusters of objects generated by a clustering technique.

FIG. 7 shows four exemplary clusters 702 of objects 604 generated by the clustering technique. For each cluster 702, the average score 704 of the objects 604 belonging to that cluster 702 may be computed and used in the next step 210.

At 210, the data representation module 124 projects the clusters of objects into one or more planes. It should be noted that if the user chooses less than three criteria to make a decision, this step may be omitted. The planes may be two-dimensional and parallel in a three-dimensional space. Each plane represents attributes of objects (or clusters of objects) within a predetermined range of rank scores (or average rank scores). The distance between objects on each plane may be associated with the degree of similarity between the objects. Generally, objects that are closer to each other are more similar that those which are further away from each other. The edges of the planes may represent axes of criteria, which provide information about how well (or poorly) each object is performing with respect to each criterion.

To perform the projection, criteria data instead of raw data $f_k$ (or) (i.e. attribute data of the objects) may be used. Criteria data generally refers to raw data that is complemented by preference information. Such criteria data may include, for instance, the uni-criterion net scores $\phi^k(o_i)$ generated by step 206. A matrix of criterion scores may be provided as input for a two-dimensional projection method of the objects. In some implementations, a radial coordinate visualization (RadViz) projection method is applied. It should be appreciated, however, that other methods such as principal component analysis (PCA), Gaia-plane, VizRank, etc., may also be used.

Figure 8:
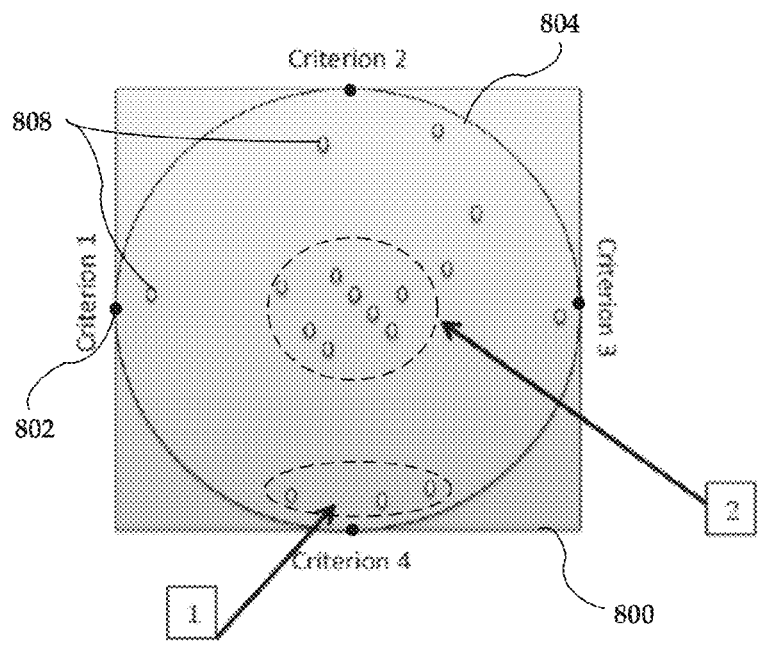
FIG. 8 shows an exemplary RadViz projection plane.

FIG. 8 shows an exemplary RadViz projection plane 800. The RadViz method can typically display data on three or more criteria in a two-dimensional projection plane. As shown, the criteria (e.g., Criterion 1, Criterion 2, Criterion 3 and Criterion 4) are presented as anchor points 802 equally spaced around the perimeter of a unit circle 804. Object instances are shown as points 808 inside the circle 804. The positions of the points 808 within the circle 804 represent the associated objects' performances on the different criteria 802. If an object performs relatively much better on one particular criterion than other criteria, it will be presented away from the middle of the circle 804. For instance, the group of objects (1) performed much better on criterion 4 than any other criterion. If, on the other hand, the performances on all criteria are quite similar, the objects will be presented nearer to the center of the circle (e.g. group (2)).

In some implementations, the input data of the RadViz method includes the weighted uni-criterion scores generated by step 206 previously described with reference to FIG. 2. The weighted uni-criterion scores may be normalized to lie between 0 and 1 (instead of −1 and 1). In order to take into account the weight values $w_j$ in the representation, the criterion scores may be multiplied by the following factor:

$$\frac{w_j}{\max(w_1, \ldots, w_k)}, \text{ if } \exists\, w_j \neq 0 \qquad (9)$$

By using only uni-criterion scores and not global scores, however, objects with low scores on all criteria and objects with high scores on all criteria may all be located together at or near the center of the circle 804. One exemplary solution is to color the points 808 according to their scores. However, where there are many objects, it may be difficult to visually differentiate the objects based on the colors.

Figure 9:
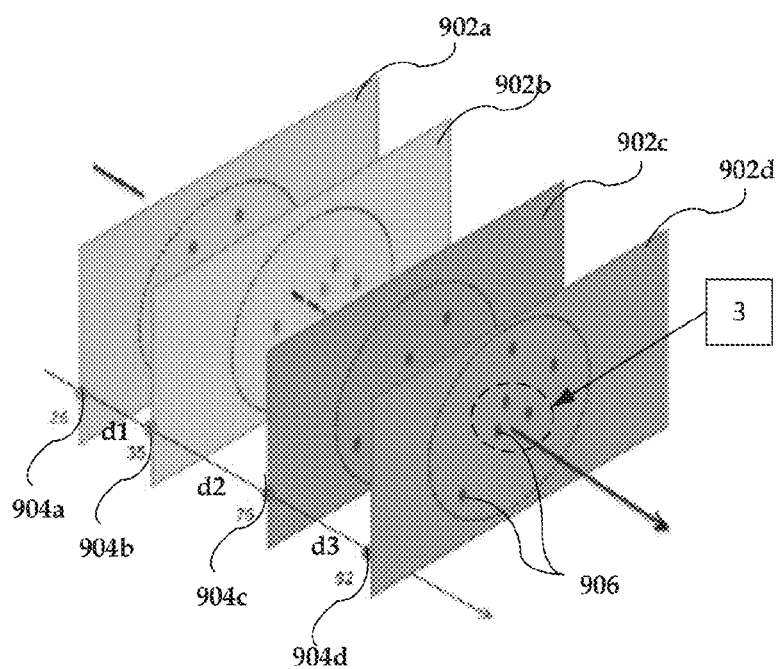
FIG. 9 illustrates an exemplary score-based parallel plane decomposition.

Alternatively, the plane 800 may be decomposed into two or more parallel "RadViz" planes to separate closely located projected objects (or clusters of objects). FIG. 9 illustrates an exemplary score-based parallel plane decomposition. As shown, the plane 800 may be decomposed into a set of parallel planes 902a-d. Different planes 902a-d corresponds to different ranges of scores (or score categories). The ranges of scores may correspond to the clusters obtained by, for instance, step 208 previously described with reference to FIG. 2. In addition, each plane 902a-d may be associated with an average score 904a-d of objects belonging to the corresponding cluster. The distance (d1-d3) between any two planes may correspond to the difference between the average scores 904a-d of the two planes. Accordingly, the output of this decomposition may include different score planes 902a-d separated by specific distances d1-d3, each plane containing clusters of objects 906 at specific locations ($x_i$, $y_i$). Objects that are located near the center of a particular plane (e.g., group (3)) have similar features and similar scores.

At 212, the data representation module 124 optimizes one or more visualization features of the objects on each plane. In some implementations, the data representation module 124 generates an optimized two-dimensional plane with non-overlapping icons that represent the objects. Such icons generally refer to any type of graphical representations, including two-dimensional or three-dimensional images (e.g., squares, spheres, circles, cubes, etc.). Visualization features (e.g., location, size, shape, transparency, color, etc.) of such icons or graphical representations may be optimized to enhance visualization.

Figure 10:
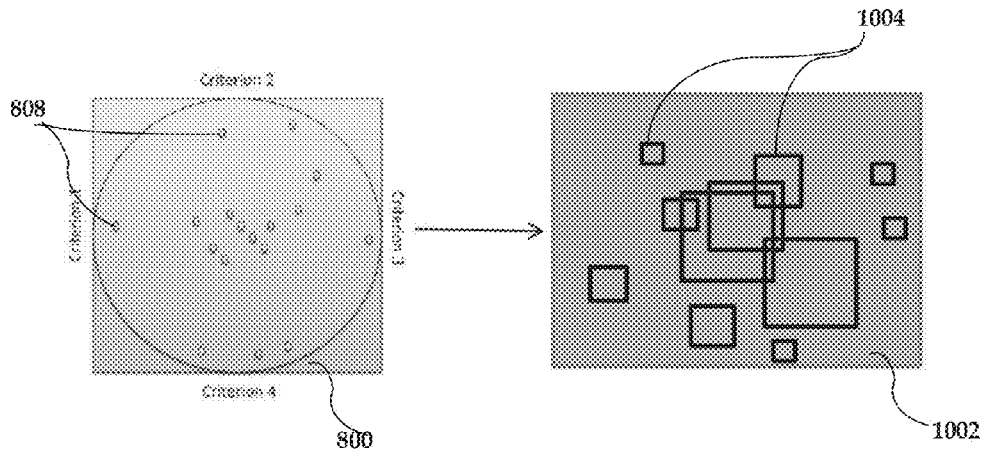
FIG. 10 illustrates an exemplary optimized two-dimensional plane generated based on the projection plane.

FIG. 10 illustrates an exemplary optimized two-dimensional plane 1002 generated based on the projection plane 800. As discussed previously with reference to FIG. 8, object instances may be presented as points 808 on the projection plane 800. These points 808, however, are not very useful in helping the user to visualize the relative scores associated with the objects. To make the presentation more user-friendly, the points 808 may be replaced by graphical representations or icons (e.g., square images) 1004 presented on the plane 1002. The size of each icon 1004 may be determined based on its associated rank score computed by, for example, step 206.

In some situations, the icons 1004 may overlap with each other and cause visual confusion. A heuristic-based algorithm may be used to re-position and re-scale the icons 1004 to avoid or minimize overlapping, while still allowing the position of each icon to reflect the weakness and strength of each object on different weighted criteria.

Figure 11:
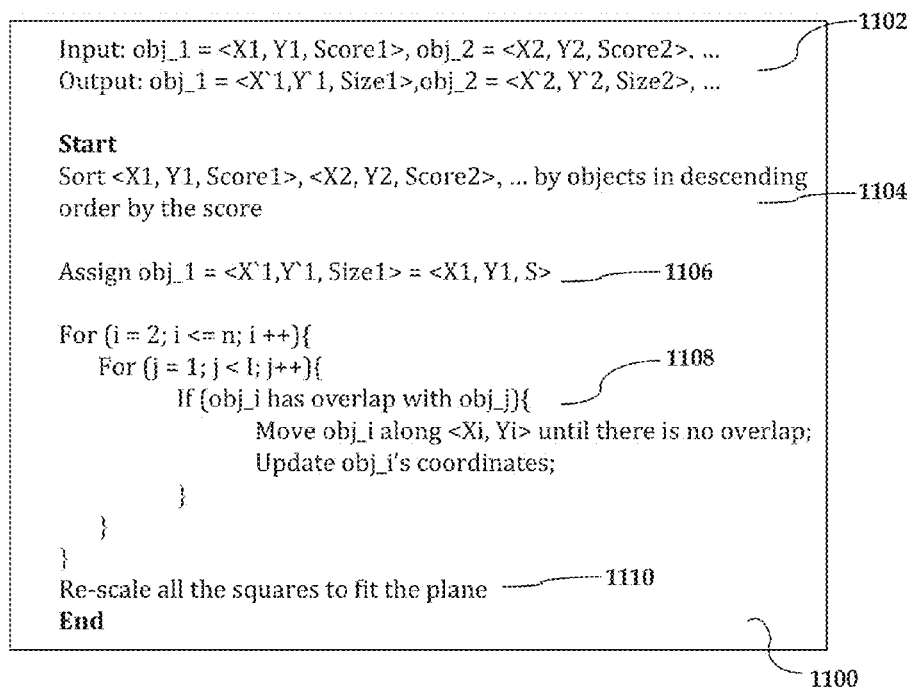
FIG. 11 shows a pseudo code for an exemplary method of minimizing overlapping between icons.
Figure 12:
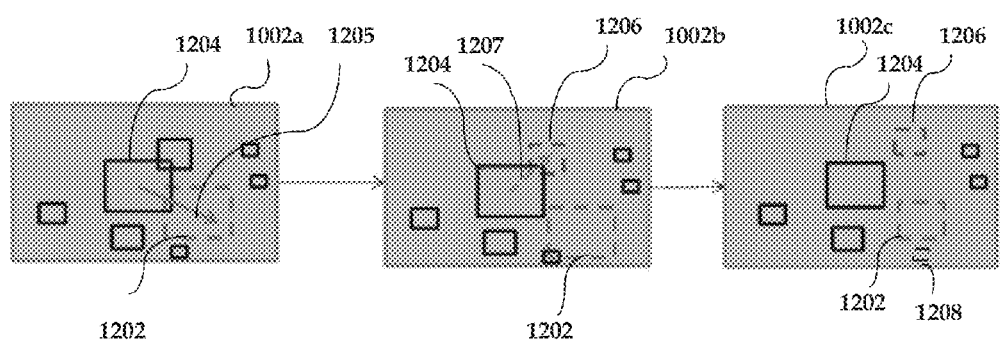
FIG. 12 is a graphical illustration of an exemplary method of minimizing overlapping between icons.

FIG. 11 shows pseudo code 1100 for an exemplary method of minimizing overlapping between icons, and FIG. 12 is a graphical illustration of the exemplary method. Referring to FIG. 11, at 1102, each object (or icon) may be represented as <Xi, Yi, Score> in the two-dimensional space, where Xi and Yi are the coordinates and Score is the rank score value. The center of the plane may be defined at (0, 0) in the two-dimensional space. For each object, the vector <Xi, Yi> represents the weakness and strength on different weighted criteria. Therefore, translating the icon along this vector will maintain this characteristic.

Since objects with higher rank scores are more important and represented by larger icons, one heuristic rule assigns less movement to icons representing higher ranking objects. Accordingly, at 1104, the exemplary method sorts the objects in descending order by the rank score. At 1106, a square icon with a predetermined size S is assigned to the first object (obj_1). Other objects may be assigned square icons with sizes that are proportional to the associated objects' rank scores.

At 1108, starting with the second largest square icon (i.e., i=2), if each given square icon (obj_i) overlaps with another larger square icon, the given square icon (obj_i) is translated along its vector <Xi, Yi> until there is no overlap. For instance, referring to FIG. 12, the second largest square icon 1202 presented on plane 1002a overlaps with another larger square icon 1204. To avoid overlapping, the icon 1202 is translated along its vector 1205, resulting in the positioning shown by plane 1002b. Similarly, icon 1206 is translated along its vector 1207 to avoid overlapping with the larger icon 1204 on plane 1002c.

Referring back to FIG. 11, at 1110, all the square icons are re-scaled to fit the plane if necessary. In some cases, the plane space is not large enough to contain all the icons without overlapping. In order to contain all the icons on the same plane, the sizes of the icons may be changed to fit them on the plane. For example, the size of each icon may be divided by a constant value, thereby maintaining the relative sizes and spacing between the icons. For instance, as shown by FIG. 12, the icon 1202 is resealed to avoid overlapping with icon 1208 on plane 1002c.

Figure 13:
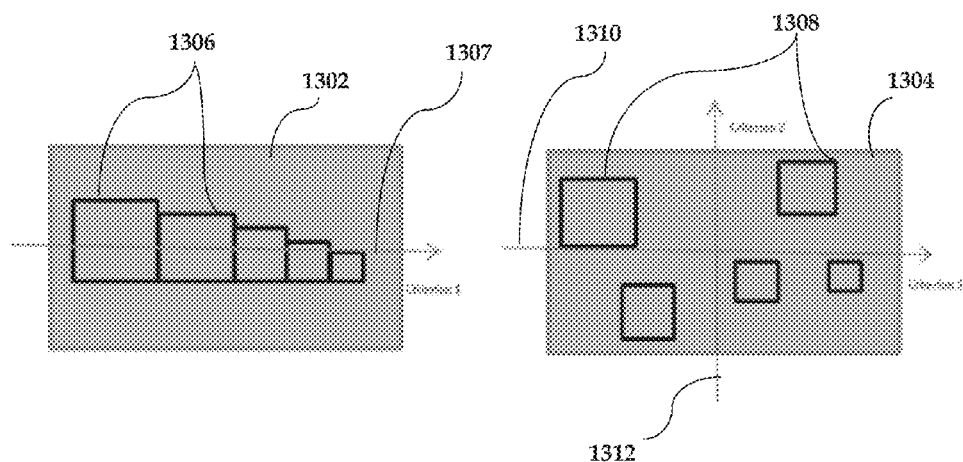
FIG. 13 shows two exemplary special cases.

As discussed previously, when the number of criteria is one or more (i.e. less than three), step 210 may be omitted. In such cases, the image representation may be treated differently. FIG. 13 shows two exemplary special cases. Plane 1302 presents objects based on one criterion (i.e., k=1), while plane 1304 presents objects based on two criteria (i.e., k=2). On plane 1302, all the objects 1306 are sorted according to their scores and presented along a single horizontal axis 1307. On plane 1304, the objects 1308 are presented in a two-dimensional space defined by horizontal and vertical axes (1310 and 1312) representing Criterion 1 and Criterion 2 respectively. Each object 1308 is positioned based on their criteria scores.

Returning to FIG. 2, at 214, the data representation module 124 determines if the optimization of visualization features is successful. The optimization may be determined to be successful if, for instance, there is no overlapping between the object icons. If the optimization is determined to be successful, the process continues at 216.

If the optimization is determined to be not successful, steps 208, 210 and 212 are repeated. For example, in cases where there are too many objects presented on a plane, it may not be possible to find an optimal solution that avoids overlapping between icons. In order to reduce or avoid overlapping, the number of clusters may be increased in step 208 to reduce the number of objects grouped in each clusters. The increased number of clusters may then be projected onto a greater number of projection planes in step 210. Each projection plane may include a lower density of object icons than the previous iteration, making it easier to avoid overlapping. At 212, the visualization features of the objects on each plane are then optimized to avoid or minimize overlapping between icons.

At 216, the user interface module 122 generates a visualization of the objects based on the visualization features determined by the data representation module 124. The visualization may be interactive to allow the user to set filter, provide preference information and navigate between different planes using, for example, 3D navigational tools. Such visualization advantageously allows the user to compare objects in a user-friendly manner.

Figure 14A:
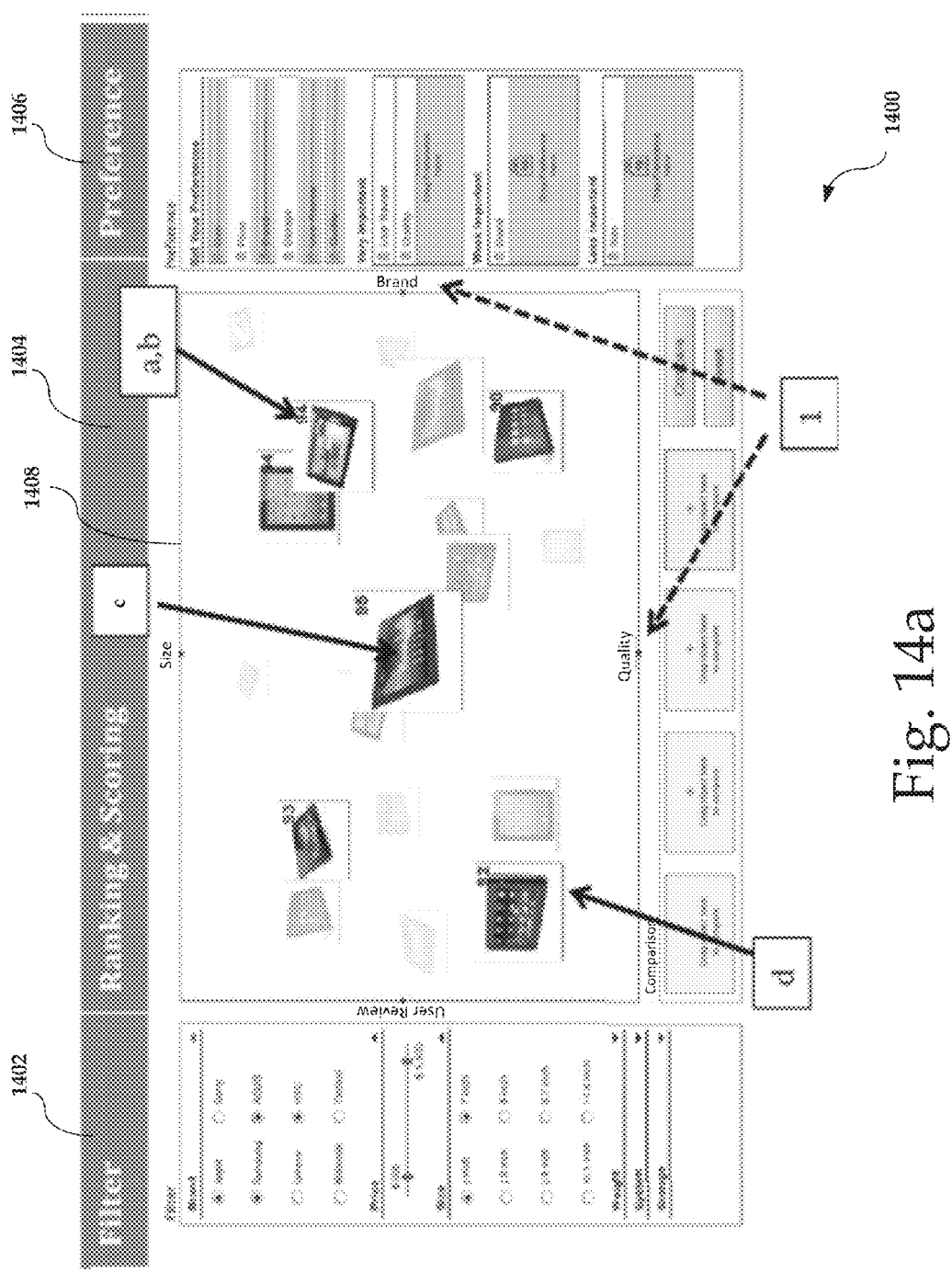
FIG. 14a shows an exemplary visualization of objects.

FIG. 14a shows an exemplary visualization 1400 of objects generated in accordance with one implementation of the present framework. As shown, visualization 1400 includes a filter section 1402, a ranking and scoring section 1404 and a preference section 1406. The filter section 1402 enables the user to set filters for refining search results, while the preference section 1406 allows the user to specify preference information, such as setting search criteria, indicating the importance of each activated criterion, and so forth.

The ranking and scoring section 1404 presents icons (a, b, c, d) of retrieved objects optimized in accordance with the present framework. As discussed previously, the size of each icon may be proportional to the rank score of each object. In addition, the degree of transparency (or fading) may be proportional to the distance between the plane the icon lies and the current plane.

Features of the objects may be indicated along the perimeter 1408 of the visualization plane. For example, the features quality and brand are indicated along quadrant 1 of the plane. The position of each icon may be optimized according to the intrinsic features of each object. For instance, icons a and b lie in the upper quadrant, indicating that their associated objects perform better on Size and Brand. In contrast, the object associated with icon d performs between on Quality and User Review. The object associated with icon c has the best score and is positioned in the middle, thereby indicating that it performs equally well on all features.

Figure 14B:
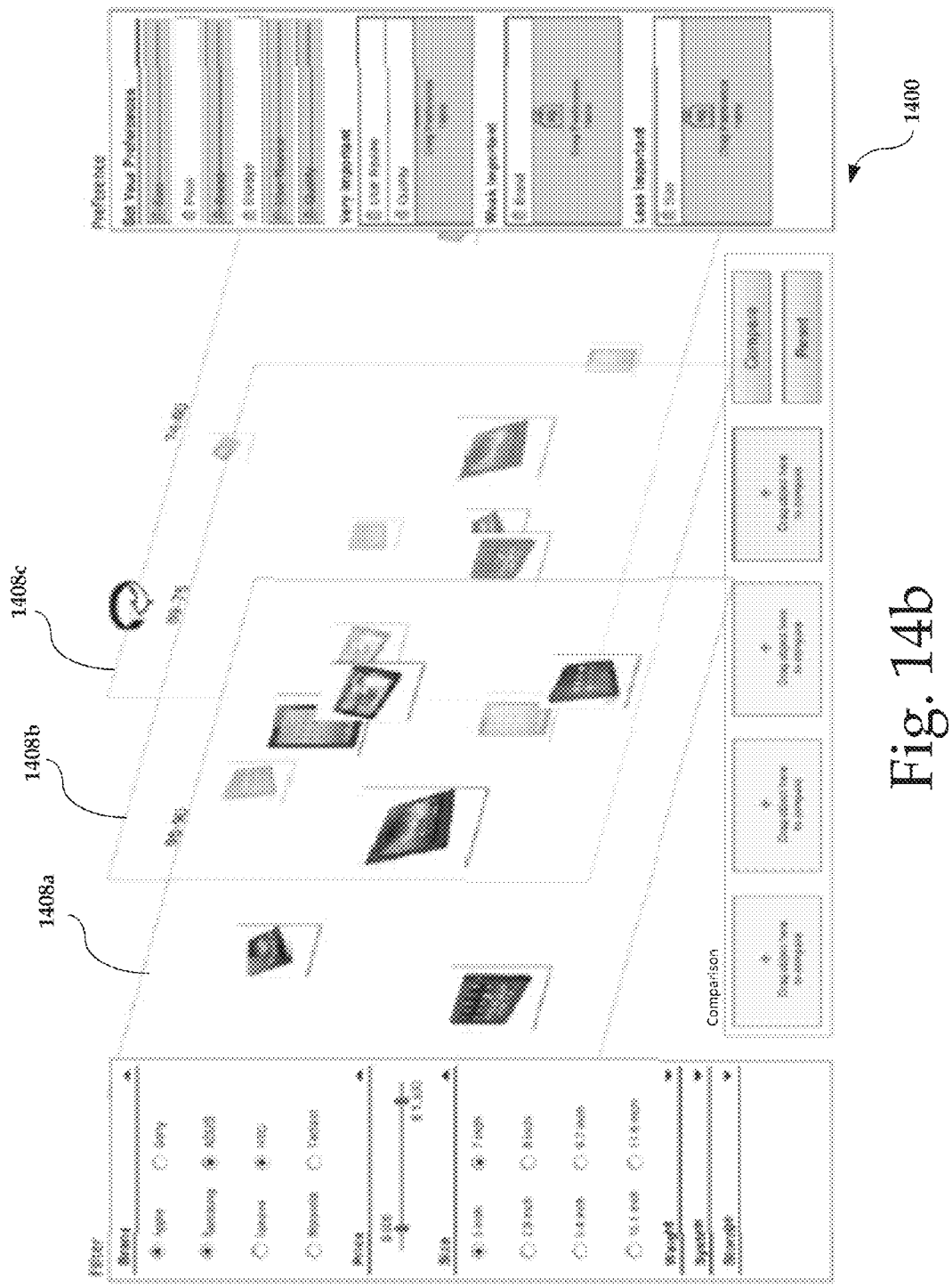
FIG. 14b shows an exemplary visualization of objects where the visualization planes are rotated for viewing.

FIG. 14b shows an exemplary visualization 1400 of objects where the visualization planes 1408a-c are rotated for viewing. By rotating the planes 1408a-c, the user can observe the search results in a 3D view. Using the 3D view, the user can get a clear idea about the ranking and scoring of objects, since different visualization planes correspond to different score categories (or ranges).

Figure 14C:
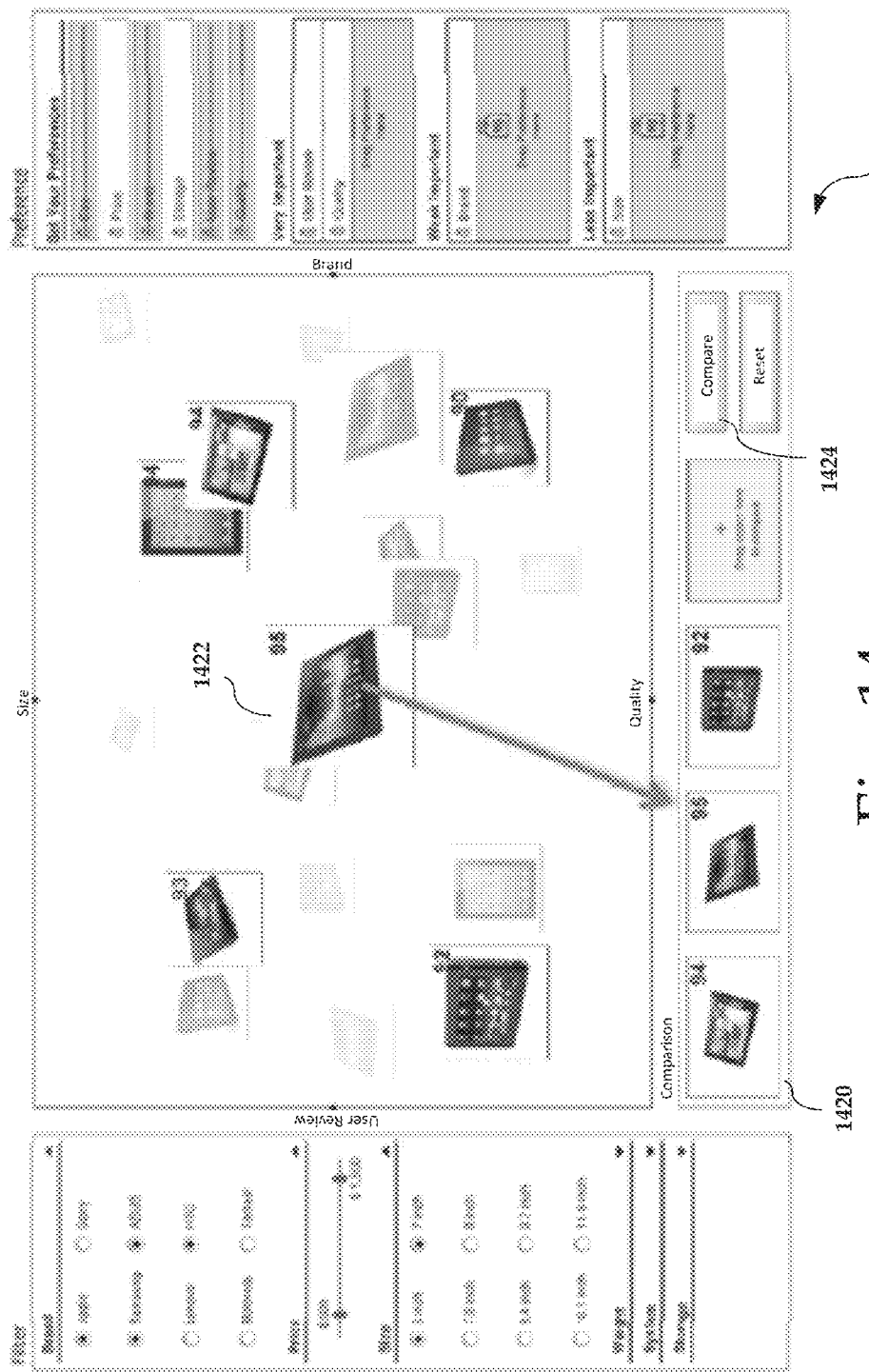
FIG. 14c shows an exemplary visualization of objects for comparison.

FIG. 14c shows an exemplary visualization 1400 of objects for comparison. The visualization 1400 includes a comparison section 1420 where the user may select two or more objects for comparison on specific criteria. The user may select and "drag" the icon 1422 to the comparison section 1420 to compare the associated object with other objects in the section 1420. By selecting the "Compare" button 1424, the user may see a pairwise comparison of the results in another exemplary visualization 1500 as shown in FIG. 15.

Figure 15:
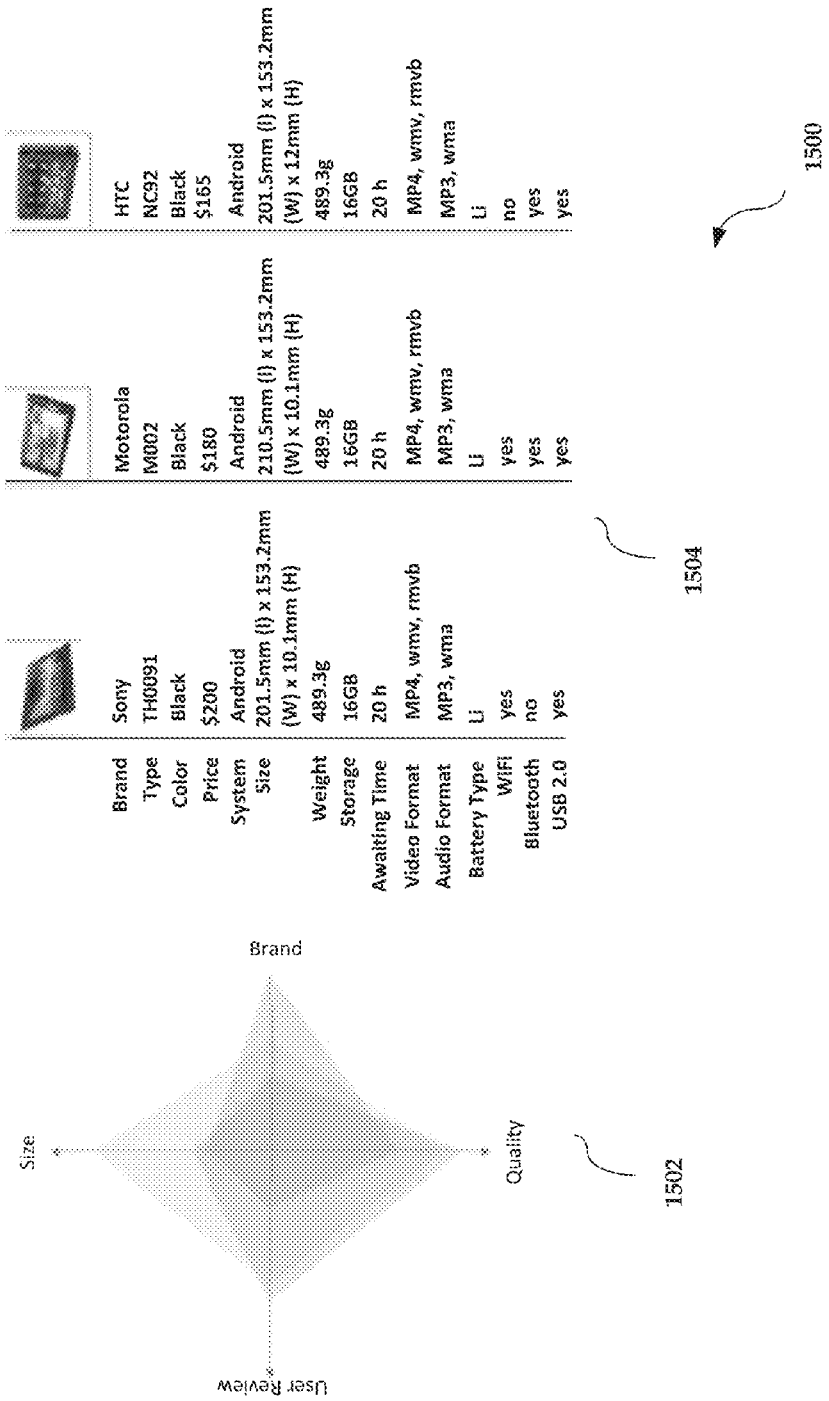
FIG. 15 shows an exemplary visualization for pairwise comparison of search results.

FIG. 15 shows an exemplary visualization 1500 for pairwise comparison of search results. Visualization 1500 includes a radar chart 1502 and a table 1504 listing detailed information of each object to enable a side-by-side comparison by the user.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A method of data representation, comprising:
   acquiring, by a processor, preference information from a user;
   generating, by the processor, rank scores of objects based at least in part on the preference information;
   grouping, by the processor, the objects into one or more clusters of objects based on the rank scores;
   projecting the one or more clusters of objects into one or more planes;

decomposing at least one of the one or more planes into multiple parallel planes, wherein each of the parallel planes corresponds to a different range of scores; and generating, by the processor, a visualization of the one or more clusters of objects.

2. A method of data representation, comprising:

acquiring, by a processor, preference information from a user;

generating, by the processor, rank scores of objects based at least in part on the preference information, wherein generating the rank scores includes determining pairwise preference degrees based on the preference information, determining uni-criterion scores based on the pairwise preference degrees, and determining the rank scores based on the uni-criterion scores;

grouping, by the processor, the objects into one or more clusters of objects based on the rank scores; and generating, by the processor, a visualization of the one or more clusters of objects.

3. The method of claim 2 wherein the preference information further includes one or more comparison thresholds.

4. The method of claim 2 wherein the preference information includes search criteria information and categorical values or numerical values that indicate user-perceived relative importance of the search criteria.

5. The method of claim 4 wherein the categorical values include sub-categorical values that indicate user-perceived relative importance of the search criteria within a single category.

6. The method of claim 2 wherein the preference information includes search criteria information and pairwise comparison values, wherein a pairwise comparison value is associated with user-perceived relative importance of a pair of search criteria.

7. The method of claim 4 further comprising transforming the categorical values into the numerical values.

8. The method of claim 7 wherein transforming the categorical values into the numerical values comprises:

computing a pairwise comparison matrix based on the categorical values; and determining the numerical values based on the pairwise comparison matrix.

9. The method of claim 5 further comprising transforming the sub-categorical values into numerical values.

10. The method of claim 2 wherein determining the pairwise preference degrees based on the preference information comprises determining the pairwise preference degrees based on indifference and preference thresholds derived from the preference information.

11. The method of claim 2 wherein grouping the objects into the one or more clusters of objects comprises performing a K-means clustering method.

12. The method of claim 2 further comprising projecting the one or more clusters of objects into one or more planes.

13. The method of claim 12 wherein projecting the one or more clusters into the one or more planes comprises performing a radial coordinate visualization projection method.

14. The method of claim 12 further comprising decomposing at least one of the one or more planes into multiple parallel planes, wherein each of the parallel planes corresponds to a different range of scores.

15. The method of claim 14 wherein distance between the parallel planes corresponds to difference between average scores of the parallel planes.

16. The method of claim 12 further comprising optimizing visualization features of the one or more projected clusters of objects and generating the visualization based on the optimized visualization features.

17. The method of claim 16 wherein optimizing the one or more visualization features comprises generating graphical representations of the objects in the one or more planes.

18. The method of claim 17 further comprising re-positioning or re-scaling the graphical representations to minimize overlapping between the graphical representations.

19. A computer readable medium embodying a program of instructions executable by a machine to perform steps for data representation, the steps comprising:

acquiring preference information from a user;

generating rank scores of objects based at least in part on the preference information;

grouping the objects into one or more clusters of objects based on the rank scores;

projecting the one or more clusters of objects into one or more planes;

decomposing at least one of the one or more planes into multiple parallel planes, wherein each of the parallel planes corresponds to a different range of scores; and generating a visualization of the one or more clusters of objects.

20. A system comprising:

a memory device for storing computer readable program code; and a processor in communication with the memory device, the processor being operative with the computer readable program code to perform steps for data representation, the steps comprising acquiring preference information from a user, generating rank scores of objects based at least in part on the preference information, grouping the objects into one or more clusters of objects based on the rank scores, projecting the one or more clusters of objects into one or more planes;

decomposing at least one of the one or more planes into multiple parallel planes, wherein each of the parallel planes corresponds to a different range of scores; and generating a visualization of the one or more clusters of objects.

* * * * *